United States Patent [19]

Antoon, Jr.

[11] Patent Number: 4,910,032

[45] Date of Patent: Mar. 20, 1990

[54] WATER-PERMEABLE CONTROLLED ATMOSPHERE PACKAGING DEVICE FROM CELLOPHANE AND MICROPOROUS FILM

[75] Inventor: Mitchell K. Antoon, Jr., Wilmington, Del.

[73] Assignee: Hercules Incorporated, Wilmington, Del.

[21] Appl. No.: 272,026

[22] Filed: Nov. 16, 1988

[51] Int. Cl.$^4$ .................... A23B 7/148; B65D 85/50; B65D 81/20

[52] U.S. Cl. .................................. 426/118; 426/106; 426/127; 426/415; 426/396; 426/419; 206/423; 206/213.1; 47/84

[58] Field of Search ............... 426/419, 415, 118, 395, 426/396, 316, 324, 418, 106, 127; 206/423, 213.1; 47/84

[56] References Cited

U.S. PATENT DOCUMENTS

| | | | |
|---|---|---|---|
| 2,611,709 | 9/1952 | Plagge | 426/419 |
| 3,102,777 | 9/1963 | Bedrosian et al. | 426/419 |
| 3,423,212 | 1/1969 | Purcell et al. | 426/415 |
| 3,450,542 | 6/1969 | Badran | 426/415 |
| 3,450,543 | 6/1969 | Badran et al. | 426/415 |
| 3,450,544 | 6/1969 | Badran et al. | 426/415 |
| 3,507,667 | 4/1970 | Magnen | 426/419 |
| 3,630,759 | 12/1971 | Rumberger | 426/415 |
| 3,795,749 | 3/1974 | Cummin et al. | 426/415 |
| 3,798,333 | 3/1974 | Cummin et al. | 426/415 |
| 3,804,961 | 4/1974 | Cummin et al. | 426/415 |
| 4,055,672 | 10/1977 | Hirsch et al. | 426/396 |
| 4,209,538 | 6/1980 | Woodruff | 426/419 |
| 4,423,080 | 12/1983 | Bedrosian et al. | 426/415 |
| 4,461,420 | 7/1984 | Horvath | 426/395 |
| 4,485,133 | 11/1984 | Ohtsuka et al. | 426/124 |
| 4,487,791 | 12/1984 | Komatsu et al. | 426/124 |
| 4,513,015 | 4/1985 | Clough | 426/356 |
| 4,515,266 | 5/1985 | Myers | 426/419 |
| 4,769,262 | 9/1988 | Ferrar et al. | 426/106 |
| 4,830,863 | 5/1989 | Jones | 426/418 |
| 4,842,875 | 6/1989 | Anderson | 426/419 |

FOREIGN PATENT DOCUMENTS

| | | | |
|---|---|---|---|
| 0178218 | 4/1986 | European Pat. Off. | 426/106 |
| 2033541 | 4/1970 | France | 426/410 |
| 1590579 | 5/1970 | France | 426/419 |
| 2531042 | 2/1984 | France | 426/118 |
| 47-17187 | 5/1972 | Japan | 426/419 |
| 53-8781 | 3/1978 | Japan | 426/415 |
| 56-10459 | 2/1981 | Japan | 426/106 |
| 740190 | 6/1980 | U.S.S.R. | 426/419 |
| 829484 | 5/1981 | U.S.S.R. | 426/106 |

OTHER PUBLICATIONS

Modern Packaging, vol. 40 #2 (1966) P. Veeraju and M. Karel, "Controlling Atmosphere in a Fresh Fruit Package", pp. 169–172, 254.
Package Engineering 8/74, p. 51.
Modern Packaging, 6/48, pp. 163–165.

Primary Examiner—Steven Weinstein
Attorney, Agent, or Firm—David Edwards

[57] ABSTRACT

A container capable of creating within it preselected $CO_2$, $O_2$, and moisture concentrations in the presence of respiring fresh fruit, vegetables, or flowers is constructed of a substantially gas-impermeable material having a gas-permeable panel that is substantially impermeable to moisture in one or more of its walls to provide a controlled flow of $CO_2$ and $O_2$ through its walls and a cellophane panel that is substantially impermeable to the flow of $CO_2$ and $O_2$ in one or more of its walls to provide a controlled flow of moisture through its walls. The gas-permeable panel is a uniaxially or biaxially oriented film where the size of the area it covers is a function of its permeance, the amount and respiration rate of the contents, and the desired steady-state oxygen concentration. The size of the cellophane panel is a function of its permeance to water vapor and the desired rate of removal of water vapor from the package.

12 Claims, No Drawings

WATER-PERMEABLE CONTROLLED ATMOSPHERE PACKAGING DEVICE FROM CELLOPHANE AND MICROPOROUS FILM

BACKGROUND OF THE INVENTION

This invention relates to the controlled atmospheric storage of fresh produce (ie., fruit, vegetables, and flowers), and especially to a package using cellophane and uniaxial microporous film panels that controls the atmosphere surrounding the packaged produce to improve retention of produce freshness without moisture build-up.

In the field of Controlled Atmosphere Packaging (CAP), it has been established that the shelf life of fruits and vegetables can often be extended by enclosing them in slightly permeable films or containers. If the permeability of the container material(s) is chosen properly with regard to the respiration rate and weight of the produce, the $O_2$ and $CO_2$ levels within the container can be made to equilibrate at levels much different from the normal atmospheric levels of 21% of $O_2$ and 0.03% of $CO_2$. If, for example, the atmosphere in a container of strawberries is made of equilibrate at about 5% of $O_2$ and at about 16% of $CO_2$, certain aspects of the strawberry appearance/flavor/texture are either improved or degraded at a slower rate; it is said that the "shelf life" has been extended.

Some produce items, such as mushrooms and strawberries, liberate water vapor very rapidly due to rapid respiration and/or rapid evaporation from the produce surface. When packaged by controlled atmosphere packaging (hereinafter referred to as "CAP"), an undesirable excessive amount of condensation of moisture is on the surfaces of the produce and on the package. This moisture condensation and high humaidity cause the problems of water-logging and a poor slimy surface txture on mushrooms.

Prior to the present invention, the moisture problem in CAP containers has been dealt with in several ways. U.S. patents 4,079,152 and 4,423,080 disclose the insertion of a packet formed from water permeable uncoated cellophane film or Tyvek film (a film formed from polyethylene marketed by E. I. duPont de Nemours & Co.) containing a desiccant and $CO_2$ absorber (such as calcium chloride, lithium chloride, ethylene glycol, silica gel, calcium hydroxide, etc.) into CAP containers; the packet absorbs moisture and $CO_2$ from the container's environment preventing mold growth or other respiratory injury to the produce. U.S. patent 3,795,749 discloses wrapping lettuce in a plasticized polyvinyl chloride film that permits $CO_2$ to freely escape from the package and allows some moisture to escape but retains enough moisture in the package to prevent the lettuce from drying out.

CAP containers using a cellophane or coated cellophane film layer in combination with another film layer such as polypropylene or polyethylene for controlling the atmosphere in the container are disclosed in U.S. patents 4,055,672 and 3,574,642.

Nonw of this prior art discloses the instant invention.

SUMMARY OF THE INVENTION

This invention is directed to a container capable of creating within it preselected carbon dioxide, oxygen, and moisture concentrations in the presence of respiring fresh fruit, vegetables, or flowers, that is constructed of a substantially gas-impermeable material having a gas-permeable panel that is substantially impermeable to moisture in one or more of its walls to provide a controlled flow or flux of $CO_2$ and $O_2$ through its walls and a cellophane panel that is substantially impermeable to the flow of $O_2$ and $CO_2$ but is permeable to moisture, in one or more of its walls to provide a controlled flow of moisture through its walls where the gas-permeable panel is a microporous plastic membrane that is a uniaxially or biaxially oriented film of a polymer selected from a homopolymer, copolymer, or blends thereof of a polymeric material, said film having an oxygen and carbon dioxide permeance between about 5,000 and 10,000,000 cc/100 in$^2$-atm-day, the permeance and area of the film being such as to provide a flux of $O_2$ and $CO_2$ respiration rates for not more than 3.0 kg of the enclosed fruit, vegetable, or flower, and having an $O_2$ to $CO_2$ permeance ratio of about 1.

DETAILED DESCRIPTION OF THE INVENTION

It has been found that by replacing part of the package surface by a material which is highly permeable to water vapor and substantially impermeable to $O_2$ and $CO_2$ at 10° C., such as cellophane, the moisture problem is greatly reduced. The cellophane lets excess water out of the package without significantly affecting the $O_2$ and $CO_2$ levels and a microporous uniaxially-oriented filled polyolefin (such as polypropylene) membrane controls the $O_2$ and $CO_2$ levels at desired levels as usual.

Thus, the present invention relates to a controlled atmosphere packaging device which includes a film or panel of which a portion is of a controlled atmosphere (oxygen/carbon dioxide permeability) material which is substantially impermeable to water vapor, and another film or panel which is substantially oxygen/carbon dioxide impermeable but is permeable to water vapor.

The permeance of the oxygen permeable panel is in the range of 5,000 to 10,000,000 cc/100 in$^2$-atm-day as measured by a pressure driving force (PDF) permance testing device; the water vapor permeance of the water vapor permeable portion is in the range of from about 2 to 30 grams/100 in$^2$-day when measured at 10° C. when subjected to a driving force of about 100% relative humidity (RH) on one side of the film and about 50% relative humidity (RH) on the opposite side.

The two films or panels may be separate or may partially overlap so as to combine one film which primarily controls the $O_2$ and $CO_2$ levels in the package with a second film which primarily controls the $H_2O$ level. An example of a partially overlapping of the two films or panels is where the water vapor permeable film is used as a lid stock over an impermeable package and the $O_2$ and $CO_2$ permeable microporous film is glued over a cut-out opening in the surface of the lid stock; a vice versa arrangement is also contemplated. Yet another example is where the water vapor permeable film (such as cellophane) and the microporous film are laminated together where equal size pieces (such as shaped as a rectangle) of the two materials each having a hole cut out (in any desired shape or area) are glued together such that in one cut-out area there is only the water vapor permeable film and in the other cut-out area there is only microporous film.

The sizes of the water vapor permeable film and microporous film can vary depending on many factors such as the respiration rate of the produce, weight of produce, desired time to steady-state atmosphere, temperature, etc. Normally, each panel will be less than 10 in$^2$ in total size. If one material is a lid stock, the area can be up to 100 in$^2$ in total size. The size and permeance of the water vapor permeable film is chosen with regard to the respiration rate so that excess moisture is vented from the package in such a way as to prevent slimy wet surfaces without inducing excessive drying out of the produce. The permeance and size of the microporous panel are chosen so as to create a desirable steady-state atmosphere. The size of the microporous film panel is calculated based on the film's permeance, package temperature, produce weight, produce respiration characteristics, and the desired steady-state atmosphere.

Examples of the water vapor permeable film include cellophane, other polymers such as polyurethanes, crosslinked polydimethylsiloxane ("silicone") membranes and siliconecoated microporous films.

The cellophane panel is preferably an uncoated grade of cellophane having the water vapor transmission rate characteristics cited above. Examples of such uncoated cellophanes include the following cellophane products marketed by Flexel Company of Covington, Indiana: 128 PUT-76, 140 PUT-77, 150 PUT-76, 160 PUT-76, 130 PU SD-2, 195 PUT SD-2, and 215 PUT-79. Unacceptable types of cellophane include coated or laminated cellophanes where the coating or lamination presents a significant barrier to the transmission of water vapor.

The above concepts apply in cases where the permeance of the oxygen-permeable CAP panel is in the permeance range of 5,000 to 10,000,000 cc/100 in$^2$-atm-day as measured by a PDF permeance method. The oxygen-permeable panel area and permeance are selected based upon the respiration rate of the particular produce item; typically, the panel area is 1 to 10 square inches. The water vapor permeance of the water-permeable panel is preferably in the range of 2 to 30 grams/100 in$^2$-day at 50% relative humidity driving force. Depending on the produce weight (up to about 3kg) and desired rate of removal of moisture vapor, the area of the cellophane, which can be in the form of a small panel or a complete lid stock, can vary between 1 and 60 square inches.

In order to adjust the permeability of the package to water vapor, a smaller cellophane panel (similar to the "CAP film" panel) can be mounted on th package instead of a full lid stock. Two partially-overlapping film materials may be employed as a means of combining one film which primarily controls the O$_2$ and CO$_2$ levels in the package with a second film which primarily controls the H$_2$O level within the package.

The CAP film of the present invention is prepared from a polymer having dispersed therein an inert filler. Useful polymers include homopolymers, copolymers, and blends thereof of alpha-monoolefins having 2 to 10 carbons, preferably 2 to 5 carbons.

Examples of homopolymers that can be used as the microporous film in the present invention are polyethylene, polypropylene, poly(1-butene), poly(3-methyl-1-butene), poly(3-methyl-1-pentene), poly(3-methyl-1-hexene), poly(4-methyl-1-hexene), and poly(4,4-dimethyl-1-hexene).

Examples of copolymers that can be used as the microporous film in the present invention are ethylene-co-propylene, ethylene-co-1-butene, ethylene-co-1-pentene, ethylene-co-1-hexene, ethylene-co-1-octene, ethylene-co-1-heptene, ethylene-co-1-nonene, and ethylene-co-1-decene.

Examples of other homo- and copolymers that can be used as the microporous film in the present invention are poly(ethylene terephthalate), poly(butylene terephthalate), nylon, polystyrene, ethylene-vinyl acetate copolymers, ethylene-methacrylic acid copolymers (ionomers), ethylene-vinyl alcohol copolymers, and polycarbonate.

Examples of blends thereof that can be used in the microporous films employed in the present invention are blends of homopolymers such as polyethylene and polypropylene or blends of a homopolymer and a copolymer such as polyethylene blended with ethylene-co-octene copolymer or ethylene-co-decene copolymer or such as a blend of polypropylene homopolymer with ethylene-co-propylene copolymer. Blends of two copolymers such as ethylene-co-1-octene and ethylene-co-1-butene can also be used.

Fillers that can be used in the microporous films employed in this invention should be inorganic and inert to the polymer, have a relatively low interfacial surface tension making it practically noncohesive toward the polymer matrix, have an average particle size of about 0.3 to 14 microns, and be present in the amount of about 36 to 60 weight percent, preferably 40–55%, (on a volume bassis 15–34% by volume, preferably 18–29% by volume) based on the total amount of polymer and filler present. Average particle size of a filler material is determined by a Coulter counter method or by microscopy.

Inert inorganic fillers that can be used in the microporous films employed in this invention include calcium carbonate, silica, diatomaceous earth, barium sulfate, titanium dioxide, and clays. Preferred fillers are calcium carbonate, silica, and barium sulfate.

An important component of the composition of the microporous film employed in this invention is the processing aid such as calcium stearate, zinc stearate, oleic acid, and stearic acid; from about 0.1 to about 2.5% by weight (or 0.2–5% volume) of the calcium stearate is preferably used in the invention.

An antioxidant stabilizer is optional in the microporous film employed in the present invention. Examples of antioxidants that can be used in the present invention are tetrakis(methylene (3,5-di-t-butyl-4-hydroxyhydrocinnamate))methane (this antoxidant is marketed commercially under the trademark IRGANOX 1010), tris (2,4-di-t-butylphenyl)phosphite (marketed commercially under the trademark IRGAPHOS 168), dilaurylthio-dipropionate (this is a thioester), and N,N'-diphenyl-p-phenylenediamine (an aryl amine). Up to 0.5% by weight (or up to 2% by volume) may be used in th film.

A particularly useful uniaxially oriented membrane having the correct porosity characteristics for use as the CAP panel in the container of this invention as defined above is a microporous film based on a composition of 36–60% by weight of a polymer selected from a homopolymer, copolymer, or blends thereof of alpha-monoolefins of 2–10 carbons, 36–60 weight percent of an inert filler having particle sizes of about 0.3–14 microns, 0.1–2.5 weight percent of a processing aid selected from calcium stearate, zinc stearate, oleic acid, and stearic acid, and 0–0.5 weight percent of a stabilizer. A particularly useful biaxially oriented membrane for use as the CAP panel is a blend of a propylene homopolymer and a propylene-ethylene copolymer having an ethylene-moiety concentration of 2 to 5 percent by weight, filled with 40 to 60% of a filler, such as calcium carbonate, based on the total weight of the film. These films should be either uniaxially oriented or biaxially oriented by drawing the film from 2 to 10 times in the machine direction and/or transverse direction.

The microporous film composition used in this invention can be prepared by conventional blending techniques using such equipment as two-roll mills, Banbury mixers, twin-screw extruders, or shell blenders. The polymeric ingredients may be mixed together in a first step and then the other ingredients added into the blend. Alternately, the entire blending operation can be performed in a single step. U.S. patent application Ser. No. 07/167,815, filed Mar. 7, 1988, now U.S. Pat. No. 4,879,078, and Ser. No. 07/123,465, filed Nov. 20, 1987, now U.S. Pat. No. 4,842,875, describe uniaxial and biaxial films useful in the present invention.

EXAMPLES

The rating system used in the following Examples for evaluating mushrooms is based on the following data set forth in TABLE A.

film for the cellophane resulted in unacceptable water-logging and slimy surfaces of the mushrooms due to excess water condensation. The PET lid stock fogged up from the excess water vapor whereas the cellophane lid stock prevented the fogging.

EXAMPLE 2

Five identical samples of mushrooms of about 171 grams each (series #1) were taken from a refrigerator at a temperature of 4° C., and were placed in impermeable plastic (poly(vinyl chloride) (PVC)) trays at room temperatures where each tray has the dimensions of 7 in by 5 in by 3 in; the trays were sealed on the top by a lid made of the PVC with two holes side by side therein, each having an area of 2 in$^2$ available for permeation of gases. A panel of cellophane 150 put 76 (marketed by the Flexel Company) was glued over one of the holes in the lid and a panel of a uniaxially oriented polypropylene film filled with 44% of $CaCO_3$ was glued over the other hole. After the sealing of the trays, they were placed in the refrigerator at a temperature of 10° C. for

TABLE A

RATING FACTORS FOR MUSHROOM EVALUATIONS

| RATING POINTS | WHITE-NESS | DIRT | BRUISES | VEILS | STEM APPEAR-ANCE | STEM GROWTH | MOISTURE | COLOR | OVERALL APPEAR-ANCE |
|---|---|---|---|---|---|---|---|---|---|
| 5 | Perfectly White | None | None | Closed Tight | White-Clear | No Growth | Dry | White | Perfect |
| 4 | White | Very Little | Very Little | Closed but Stretched | Mostly White | Less Than 50% Increase | Damp | Off White | Very Good |
| 3 | Off White | Some | Some - Detract | Some Weak -Cracked | Outer Brown Inner White | 50% Increase | Damp - Wet | Beige-Tan, Very Light Brown | Average |
| 2 | Gray | Dirty | Heavy - Detract | Some Cracked-Open | Pitted | 50%–100% Increase | Wet | Tan-Gray, Some Brown | Un-satisfactory |
| 1 | Dark or Brown | Very Dirty | Extensive | Open | Brown | More Than 100% Increase | Slimy, Water-Logged | Brown | Poor |

EXAMPLE 1

An impermeable plastic tray containing 250 ghrams of mushrooms was sealed on the top surface by about 24 in$^2$ of lid stock made of cellophane (150 PUT-76). For this cellophane, a water vapor transmission rate of 11 g/100in$^2$-day at 10° C. and 50% RH was measured; $O_2$ and $CO_2$ permeance were near zero. Over a 3 in$^2$ hole in the cellophane was glued a 4 in$^2$ panel of uniaxial $CaCO_3$- filled polypropylene CAP film (permeance =355,000 cc/100 in$^2$-atm-day by the PDF method). After 7 days of storage at 10° C., the package atmosphere equilibrated at the desired 11% of $O_2$ and 9% of $CO_2$. The mushroom surfaces were desirably dry and the package interior was free of water condensation. In contrast, substitution of water-vapor-impermeable PET about eleven days. Since the five samples of mushrooms were identical and were prepared identically, the conditions in each of the trays was identical. Hence, during the course of the eleven day storage period, one of the trays was evaluated at a set time over the eleven day period. When a particular tray was evaluated, an air tight chromatographic syringe was pierced into the tray and a sample of the atmospheric gases therein was withdrawn and analyzed on a gas chromatograph. In order to obtain the weight loss and organoleptic rating factors, the tray had to be completely opened and the mushrooms removed therefrom; in other words, the sample was destroyed for further testing and was removed from the experimental program.

The evaluation data is set forth infra in TABLE 1 for this first series of tests.

TABLE 1

SERIES #1: DUAL MEMBRANE CAP FILM SYSTEM.
Components: (1) 2 in$^2$ uniaxial PP/44% $CaCO_3$ CAP film[a]
$O_2$ permeance = 215,000 cc/100in$^2$-atm-day (PDF method)
(2) 2 in$^2$ cellophane[c], Flexel 150 PUT-76
Water vapor transmission rate = 11 g/100 in$^2$-day @
10° C. @ 50% driving force.
Experimental program: 10 days storage at 10° C.
Mushroom variety: U3 mushrooms from Phillips Mushroom Farms of Kennett Square. Pa.

|  | INITIAL | A | B | C | D | E |
|---|---|---|---|---|---|---|
| Elapsed time, days | 0.00 | 1.92 | 4.83 | 6.75 | 9.00 | 10.76 |
| Temperature °C. | 4–10 | 10 | 10 | 10 | 10 | 10 |
| Initial weight, grams | N/A | 171.1 |  | 169.8 | 170.9 | 172.2 |

TABLE 1-continued

SERIES #1: DUAL MEMBRANE CAP FILM SYSTEM,
Components: (1) 2 in² uniaxial PP/44% CaCO₃ CAP film[a]
O₂ permeance = 215,000 cc/100in²-atm-day (PDF method)
(2) 2 in² cellophane[c], Flexel 150 PUT-76
Water vapor transmission rate = 11 g/100 in²-day @
10° C. @ 50% driving force.
Experimental program: 10 days storage at 10° C.
Mushroom variety: U3 mushrooms from Phillips Mushroom
Farms of Kennett Square, Pa.

|  | INITIAL | A | B | C | D | E |  |
|---|---|---|---|---|---|---|---|
| Final weight, grams | N/A | 169.7 |  | 165.9 | 162.0 | 161.2 |  |
| % weight loss | N/A | 1.40 |  | 2.30 | 5.21 | 6.39 |  |
| CO₂ % | 0.0 | 13.4 | 14.2 | 13.4 | 15.3 | 20.0 |  |
| O₂ % | 21.0 | 9.7 | 8.6 | 8.9 | 7.6 | 3.1 |  |
| Organoleptic scores: |  |  |  |  |  |  | DELTA |
| Whitness | 3 | 2.5 | 2 | 2.25 | 2 | 2 | −1 |
| Dirt | 3 | 3 | 3 | 3 | 3 | 3 | 0 |
| Bruises | 3 | 3 | 3 | 3 | 3 | 3 | 0 |
| Veils | 5 | 5 | 5 | 5 | 5 | 5 | 0 |
| Stem Appearance | 3 | 3 | 3 | 3 | 3 | 3 | 0 |
| Stem Growth | 5 | 5 | 5 | 5 | 5 | 5 | 0 |
| Internal Color | 3.3 | 3.3 | 3 | 2.5 | 2 | 1.8 | −1.5 |
| Moisture | 5 | 4.5 | 4 | 3.75 | 3.5 | 3.25 | −1.75 |
| Overall Appearance | 5 | 4 | 3.75 | 3.5 | 3 | 2.5 | −2.5 |
| TOTAL | 35.3 | 33.3 | 31.75 | 31 | 29.5 | 28.55 | −6.75 |

[a]Composition:
Pro-fax 6501 (polypropylene) 28.0 parts
Pro-fax SA 841 (polypropylene) 28.0 parts
Atomite (CaCo3) 44.0 parts
Calcium stearate 0.560 parts
B-225 (stabilizer) 0.252 parts
Processing:
Uniaxial Orientation
Forward draw 6.0 X
Forward draw roll setting temperature = 115°C.
[c]Cellophane
Type: 150 PUT-76 from Flexel Company of Indiana Uncoated grade
Water vapor transmission rate =
11 grams/100 in²-day at 10° C. using 100% RH on one side of the film and 50% RH on the other side.

TABLE 2

SERIES #2: SINGLE MEMBRANE CAPE FILM SYSTEM
Components: (1) 2 in² uniaxial PP/44% CaCO₃ CAP film
O₂ permeance = 215,000 cc/100 in²-atm-day (PDF method)
(2) NO cellophane
Experimental program: 10 days storage at 10° C.
Mushroom variety: U3 mushrooms from Phillips Mushroom
Farms of Kennett Square, Pa.

|  | INITIAL | A | B | C | D | E |  |
|---|---|---|---|---|---|---|---|
| Elapsed time, days | 0.00 | 1.92 | 4.83 | 6.75 | 9.00 | 10.76 |  |
| Temperature °C. | 4–10 | 10 | 10 | 10 | 10 | 10 |  |
| Initial weight, grams | N/A | 172.5 | 170.0 | 170.5 | 169.4 | 170.2 |  |
| Final weight, grams | N/A | 171.2 | 167.2 | 163.5 | 163.0 | 166.2 |  |
| % Weight Loss | N/A | 0.75 | 1.65 | 4.11 | 3.78 | 2.58 |  |
| CO₂ % | 0.0 | 15.7 | 17.5 | 16.5 | 19.6 | 17.7 |  |
| O₂ % | 21.0 | 8.0 | 6.6 | 6.6 | 3.6 | 5.3 |  |
| Organoleptic scores: |  |  |  |  |  |  | DELTA |
| Whiteness | 3 | 2 | 2 | 1.75 | 2 | 1.75 | −1.25 |
| Dirt | 3 | 3 | 3 | 3 | 3 | 3 | 0 |
| Bruises | 3 | 3 | 3 | 3 | 3 | 3 | 0 |
| Veils | 5 | 5 | 5 | 5 | 5 | 5 | 0 |
| Stem Appearance | 3 | 3 | 3 | 3 | 3 | 3 | 0 |
| Stem Growth | 5 | 5 | 5 | 5 | 5 | 5 | 0 |
| Internal Color | 3.3 | 3.3 | 3 | 2.5 | 2.25 | 2 | −1.3 |
| Moisture | 5 | 3 | 2.5 | 5 | 1.75 | 1.25 | −3.75 |
| Overall Appearance | 5 | 3.5 | 3 | 2.5 | 2 | 2.25 | −2.75 |
| TOTAL | 35.3 | 30.8 | 29.5 | 30.75 | 27.0 | 26.25 | −9.05 |

TABLE 3

SERIES #3 OPEN CONTROL
Components: Package is open to free of atmospheric gases.
(1) NO uniaxial film
(2) NO cellophane
Experimental program: 10 days storage at 4–10° C.
Mushroom variety: U3 mushrooms from Phillips Mushroom
Farms of Kennett Square, Pa.

|  | INITIAL | A | B | C | D | E |  |
| --- | --- | --- | --- | --- | --- | --- | --- |
| Elapsed time, days | 0.00 | 1.92 | 4.83 | 6.75 | 9.00 | 10.76 |  |
| Temperature °C. | 4–10 | 4 | 4 | 4 | 10 | 10 |  |
| Initial weight, grams | N/A | 175.0 |  | 170.3 | 171.3 | 168.9 |  |
| Final weight, grams | N/A | 170.0 |  | 154.9 | 156.4 | 146.0 |  |
| % Weight Loss | N/A | 2.86 |  | 9.04 | 8.70 | 13.56 |  |
| $CO_2$ % | 0.0 | 0.0 | 0.0 | 0.0 | 0.0 | 0.0 |  |
| $O_2$ % | 20.9 | 20.9 | 20.9 | 20.9 | 20.9 | 20.9 |  |
| Organoleptic scores: |  |  |  |  |  |  | DELTA |
| Whiteness | 3 | 1.5 | 1.5 | 1.25 | 1 | 0.75 | −2.25 |
| Dirt | 3 | 3 | 3 | 3 | 3 | 3 | 0 |
| Bruises | 3 | 3 | 3 | 3 | 3 | 3 | 0 |
| Veils | 5 | 4 | 3 | 2 | 1 | 1 | −4 |
| Stem Appearance | 3 | 3 | 3 | 3 | 3 | 3 | 0 |
| Stem Growth | 5 | 5 | 5 | 2.5 | 2 | 2 | −3 |
| Internal Color | 3.3 | 3.3 | 3 | 2.5 | 2.25 | 2 | −1.3 |
| Moisture | 5 | 5 | 4.5 | 4 | 4 | 3.5 | −1.5 |
| Overall Appearance | 5 | 4 | 3.5 | 3 | 2.5 | 2 | −3 |
| TOTAL | 35.3 | 31.8 | 29.5 | 24.25 | 21.75 | 20.25 | −15.05 |

For the sake of comparison, two other series of tests were run similar to series #1 described supra except that in the second series only one hole was in the lid having the area 2 square inches where a piece of the uniaxially oriented polypropylene film was glued. In other words, no cellophane was used. The data is set forth in Table 2 supra. A third series of tests used no CAP film or cellophane but merely had the mushrooms opened to the atmosphere in the refrigerator; the data is set forth in Table 3 supra.

Table 1 summarizes the organoleptic data (9 rating factors) for mushrooms stored for 10+days at 10° C. in a PVC clamshell package with a "duel membrane" of cellophane and microporous uniaxial film forming a portion of the package surface. The organoleptic rating factors are defined in Table A. The calculated "delta" number in Table 1 represents the final minus initial ratings for each type of organoleptic rating factor. Since a rating of 5 is best and a rating of 1 is worst, a negative delta number indicates a worsening of that particular rating factor during the storage time. For example, in Table 1, the moisture delta after 10.76 days is −1.75. The total delta for all rating factors is -6.75. The following data will show that these delta numbers represent a substantial improvement in mushroom quality versus packaging with microporous film alone or with simple "open" packaging.

Note that the atmospheric composition, weight loss, and organoleptic rating factors are evaluated several times during the test period. In each series several packages of mushrooms are studied concurrently because whenever a package of mushrooms is evaluated, the package must be opened and removed from the experimental program.

In Table 2, the mushrooms are packaged in a similar manner, but the cellophane humidity-venting panel and the corresponding hole are absent. Note that the delta value for moisture after 10.76 days is −3.75, a full −2 worse than the rating achieved in Table 1. Similarly, the total delta for the mushrooms is a much larger and worse negative number for the mushrooms in Table 2 than in Table 1.

By the same type of analysis, Table 3 shows that the worst mushrooms of all, especially in the stem growth and veils categories, are mushrooms packaged "open," that is, without any permeable cellophane or microporous uniaxial films to regulate the internal gas composition. This atmosphere is not substantially different from ambient conditions.

EXAMPLE 3

The same procedure was followed as for Example 2 except fro minor modifications such as same sizes and number of days evaluated as will be apparent from the data in the following Tables 4 and 5. These experiments demonstrate superior packaging of mushrooms using dual membranes of uniaxially oriented CAP film and cellophane under conditions of temperature abuse.

TABLE 4

SERIES #4: DUAL MEMBRANE CAP FILM SYSTEM AT ABUSE
TEMPERATURE
Components: (1) 1 in$^2$ uniaxial PP/44% $CaCO_3$ CAP film$^b$
$O_2$ permeance = 159,000 cc/100in$^2$-atm-day (PDF method)
(2) 2 in$^2$ cellophane Flexel 150 PUT-76
Water vapor transmission rate = 11 g/100 in$^2$-day @
10° C. @ 50% RH driving force
Experimental program: 10 days storage at 4° C., 4 days storage at 13° C.
Mushroom variety: U3 mushrooms from Phillips Mushroom
Farms of Kennett Square, Pa.

|  | INITIAL | A | B | C | D | E |
| --- | --- | --- | --- | --- | --- | --- |
| Elapsed time, days | 0.00 | 2.96 | 6.80 | 8.78 | 11.96 | 13.76 |
| Temperature °C. | 4–10 | 4 | 4 | 4 | 13 | 13 |
| Initial weight, grams | N/A | 199.3 | 207.7 | 204.4 | 209.7 | 200.7 |

TABLE 4-continued

SERIES #4: DUAL MEMBRANE CAP FILM SYSTEM AT ABUSE TEMPERATURE
Components: (1) 1 in$^2$ uniaxial PP/44% $CaCO_3$ CAP film[b]
$O_2$ permeance = 159,000 cc/100in$^2$-atm-day (PDF method)
(2) 2 in$^2$ cellophane Flexel 150 PUT-76
Water vapor transmission rate = 11 g/100 in$^2$-day @
10° C. @ 50% RH driving force
Experimental program: 10 days storage at 4° C., 4 days storage at 13° C.
Mushroom variety: U3 mushrooms from Phillips Mushroom
Farms of Kennett Square, Pa.

|  | INITIAL | A | B | C | D | E |  |
|---|---|---|---|---|---|---|---|
| Final weight, grams | N/A | 195.9 | 201.1 | 197.2 | 201.5 | 191.0 | |
| % Weight Loss | N/A | 1.71 | 3.18 | 3.52 | 3.91 | 4.83 | |
| $CO_2$% | 0.0 | 11.7 | 13.6 | 10.5 | 23.0 | 23.5 | |
| $O_2$% | 20.9 | 9.3 | 9.7 | 12.0 | 1.2 | 1.4 | |
| Organoleptic scores: |  |  |  |  |  |  | DELTA |
| Whiteness | 4 | 2.8 | 2.7 | 2.7 | 2.5 | 2.5 | −1.5 |
| Dirt | 3.9 | 3.8 | 3.8 | 3.9 | 3.8 | 3.8 | −0.1 |
| Bruises | 3.8 | 3 | 3.3 | 3.7 | 3.8 | 3.5 | −0.3 |
| Veils | 4.5 | 4.4 | 4.1 | 4.2 | 4.2 | 4.2 | −0.3 |
| Stem Appearance | 4 | 3.3 | 2.8 | 3 | 2.3 | 2.2 | −1.8 |
| Stem Growth | 5 | 5 | 3.9 | 4.2 | 3 | 4 | −1 |
| Internal Color | 4.3 | 4.3 | 4 | 4.5 | 3.2 | 2.8 | −1.5 |
| Moisture | 5 | 4.5 | 4.1 | 4.4 | 4.8 | 3.9 | −1.1 |
| Overall Appearance | 3.9 | 3 | 2.9 | 3 | 2.8 | 2.6 | −1.3 |
| TOTAL | 38.4 | 34.1 | 31.6 | 33.6 | 30.4 | 29.5 | −8.9 |

[b]Same formulation for Example 2 except that the uniaxial orientation processing used forward draw of 7X with a forward draw roll setting temperature of 115° C.

TABLE 5

SERIES #5: OPEN CONTROL AT ABUSE TEMPERATURE
Components: Package is open to free flow of atmospheric gases.
(1) NO Uniaxial film
(2) NO cellophane
Experimental program: 10 days storage at 4° C., 4 days storage at 13° C.
Mushroom variety: U3 Mushrooms from Phillips Mushroom
Farms of Kennett Square, Pa.

|  | INITIAL | A | B | C | D | E |  |
|---|---|---|---|---|---|---|---|
| Elapsed time, days | 0.00 | 2.96 | 6.80 | 8.78 | 11.96 | 13.76 | |
| Temperature °C. | 4–10 | 4 | 4 | 4 | 13 | 13 | |
| Initial weight, grams | N/A | 205.9 | 208.7 | 195.0 | 203.5 | 205.8 | |
| Final weight, grams | N/A | 200.2 | 205.8 | 179.9 | 186.7 | 187.6 | |
| % Weight Loss | N/A | 2.77 | 1.39 | 7.74 | 8.26 | 8.84 | |
| $CO_2$% | 0.0 | 0.0 | 0.0 | 0.0 | 0.0 | 0.0 | |
| $O_2$% | 20.9 | 20.9 | 20.9 | 20.9 | 20.9 | 20.9 | |
| Organoleptic scores: |  |  |  |  |  |  | DELTA |
| Whiteness | 4 | 3 | 2.8 | 3.3 | 2.9 | 2.8 | −1.2 |
| Dirt | 3.9 | 3.9 | 4 | 3.9 | 3.8 | 3.8 | −0.1 |
| Bruises | 3.8 | 3 | 3 | 2.7 | 2.7 | 2.5 | −1.3 |
| Veils | 4.5 | 4 | 2.2 | 3.7 | 3.2 | 2.5 | −2 |
| Stem Appearance | 4 | 2.8 | 2.3 | 2 | 1.6 | 1.8 | −2.2 |
| Stem Growth | 5 | 5 | 1.3 | 2 | 1.2 | 1.5 | −3.5 |
| Internal Color | 4.3 | 3.75 | 3 | 2.3 | 2 | 2 | −2.3 |
| Moisture | 5 | 4.2 | 3.5 | 3.8 | 2.9 | 3 | −2 |
| Overall Appearance | 3.9 | 3.1 | 3 | 2.8 | 2.7 | 2.5 | −1.4 |
| TOTAL | 38.4 | 32.75 | 25.1 | 26.5 | 23.0 | 22.4 | −16 |

In this case, temperature abuse was defined to be four days storage at 13° C. following ten days at 4° C. Table 4 shows that mushrooms packaged with dual membranes have superior organoleptic ratings under temperature abuse conditions compared to the mushrooms packaged in "open" conditions in Table 5. The mushrooms of Table 4, using the dual membrane, did far better on stem growth (delta of −1 compared to delta of −3.5) and far better on the total delta rating (−8.9 compared to −16).

What is claimed:

1. A container for retarding the maturation of respiring fresh produce selected from the group consisting of fruits, vegetables, or flowers contained therein by creating within the container preselected carbon dioxide, oxygen, and moisture concentrations in the presence of said respiring fresh fruit, vegetables, or flowers, said container being constructed of a substantially gas-impermeable material completely enclosing said fresh fruit, vegetables, or flowers, said gas impermeable material having both a gas-permeable panel that is substantially impermeable to moisture in one or more of its walls to provide a controlled flow or flux of $CO_2$ and $O_2$ through its walls and a cellophane panel that is permeable to moisture while being substantially impermeable to the flow of $O_2$ and $CO_2$ in one or more of its walls to provide a controlled flow of moisture through its walls, wherein the gas-permeable panel is a microporous plastic membrane that is a uniaxially or biaxially oriented film of a polymer selected from a homopolymer, copolymer, or blends thereof of a polymeric material, sais oriented film having an oxygen and carbon dioxide permeance between about 5,000 and 10,000,000 cc/100 in$^2$-atm-day, the permeance and area of the membrane being such as to provide both a flux of $O_2$ and $CO_2$ approximately equal to the predicted $O_2$ to $CO_2$ respiration rates for not more than 3.0 kg of the enclosed fruit, vegetable, or flower, and having an $O_2$ to $CO_2$ permeance ratio of about 1 sufficient to maintain retardation of the maturation process of said produce for said 3.0 kg of enclosed produce, said cellophane panel having a water vapor permeance of from about 2-30 grams/100 $in^2$-day and area sufficient to vent from said container excess moisture liberated from said respiring produce to prevent slimy wet surfaces on said produce without inducing excessive drying out of said produce.

2. The container of claim 1 wherein the gas-permeable panel is a polymer selected from a homopolymer, copolymer or blends thereof of alpha-monoolefins of 2-10 carbons, poly(ethylene terephthalate), poly(butylene terephthalate), nylon, polystyrene, ethylene-vinyl acetate copolymers, ethylene-methacrylic acid copolymers, ethylene-vinyl alcohol copolymers, and polycarbonate.

3. The container of claim 2 wherein the gas-permeable panel has 36-60 weight percent of the polymer and 36-60 weight percent of an inert filler having particle sizes of about 0.1-14 microns.

4. The container of claim 3 wherein the inert filler is selected from calcium carbonate, silica, diatomaceous earth, barium sulfate, titanium dioxide, and clays.

5. The container of claim 4 wherein the gas-permeable panel has up to 0.5 weight percent of a stabilizer present selected from tetrakis(methylene(3,5-di-t-butyl-4-hydroxyhydrocinnamate))-methane, tris(2,4,-di-t-butylphenyl)phosphite, dilaurylthiodipropionate, and N,N'-diphenyl-p-phenylenediamine.

6. The container of claim 5 wherein gas-permeable panel has 0.1-2.5 weight percent of a processing aid selected from calcium stearate, zinc stearate, oleic acid, and stearic acid.

7. The container of claim 6 wherein the polymer is an alpha-monoolefin of 2-5 carbons.

8. The container of claim 7 wherein the polymer is polypropylene or a blend of a propylene homopolymer and a propylene-ethylene copolymer having an ethylene moiety concentration of 2-5% by weight.

9. The container of claim 7 wherein the membrane is drawn in either the machine direction or transverse direction or both from 2 to 10 times.

10. The container of claim 1 wherein the gas-permeable panel and cellophane panel are in at least one wall in side by side location.

11. The container of claim 1 wherein the gas-permeable panel and cellophane panel are in at least one wall in partially-overlapping relationship.

12. The container of claim 11 wherein one of said at least one wall is a lid wall and said cellophane panel and gas permeable panel substantially differ in size.

* * * * *

UNITED STATES PATENT AND TRADEMARK OFFICE
CERTIFICATE OF CORRECTION

PATENT NO. : 4,910,032
DATED : MARCH 20, 1990
INVENTOR(S) : M. K. ANTOON

It is certified that error appears in the above-identified patent and that said Letters Patent is hereby corrected as shown below:

Column 1, line 38; "txture" should read --texture--

Column 2, line 15 after "flux of $O_2$ and $CO_2$" the following should be inserted:

--approximately equal to the predicted $O_2$ and $CO_2$ --

Column 2, line 46; "th" should read --the--

Column 4, line 52; "th" should read --the--

Column 5, line 42; "ghrams" should read --grams--

Column 6, line 4; "foggedup" should read --fogged up--

Column 6, Table A - under Heading "COLOR";

"COLOR" should read --INTERNAL COLOR--

Column 10, line 49; "fro" should read --for--

UNITED STATES PATENT AND TRADEMARK OFFICE
CERTIFICATE OF CORRECTION

PATENT NO. : 4,910,032

DATED : March 20, 1990

INVENTOR(S) : Mitchell K. Antoon, Jr.

It is certified that error appears in the above-identified patent and that said Letters Patent is hereby corrected as shown below:

Column 12, line 66, Claim 1; "sais" should read --said--

Signed and Sealed this

Sixth Day of August, 1991

Attest:

HARRY F. MANBECK, JR.

*Attesting Officer*     *Commissioner of Patents and Trademarks*